United States Patent [19]

Lin

[11] Patent Number: 5,684,559
[45] Date of Patent: Nov. 4, 1997

[54] LENS POSITIONING DEVICE FOR SPECTACLES

[76] Inventor: Haan-Yeou Lin, 58, Ma Yuan West St., Taichung, Taiwan

[21] Appl. No.: 594,428

[22] Filed: Jan. 31, 1996

[51] Int. Cl.[6] .............................. G02C 1/02; G02C 5/14; G02C 5/22

[52] U.S. Cl. .................. 351/110; 351/116; 351/153; 16/228

[58] Field of Search ...................... 351/41, 106, 110, 351/111, 113, 116, 124, 126, 135, 151, 153; 16/228

[56] References Cited

U.S. PATENT DOCUMENTS 702,803  6/1902  Lembke ...................... 351/116

Primary Examiner—Huy Mai

[57] ABSTRACT

A pair of spectacles has two lenses, two temples, and a lens positioning device. The lens positioning device comprises a bridge disposed between two lenses, and two pivot supports. The pivot support is disposed between the lens and the temple. Each lens has two hook holes. Each hook hole has a recess. The bridge has two nose pads and two inserted bars. Each inserted bar has a distal end. Each pivot support has a hook, a coiled ring, and a rod. An inserted end is formed at an end of the hook. A coil is disposed at an end of each temple. The outer diameter of the coil is the same as the inner diameter of the coiled ring. The inserted bar is inserted in the hook hole. The distal end is inserted in the recess. The hook is inserted in the hook hole. The inserted end is inserted in the recess. The coil is inserted in the coiled ring.

1 Claim, 3 Drawing Sheets

LENS POSITIONING DEVICE FOR SPECTACLES

BACKGROUND OF THE INVENTION

The invention relates to a lens positioning device for spectacles. More particularly, the invention relates to a lens positioning device without the conventional frames.

Most conventional frames of the spectacles confine the size of the lenses. Thus the lenses should be modified in order to fit the corresponding frame. Since the pad and the lens are adhered together, the conventional non-framed spectacles may be detached easily after a long period of usage.

SUMMARY OF THE INVENTION

An object of the invention is to provide a lens positioning device for spectacles without the conventional frames.

Another object of the invention is to provide a lens positioning device which can position the lenses of spectacles stably.

Accordingly, a pair of spectacles comprises two lenses, two temples, and a lens positioning device. The lens positioning device comprises a bridge disposed between two lenses, and two pivot supports. The pivot support is disposed between the lens and the temple. Each of the lenses has two hook holes thereon at two opposite side portions of the lens. Each hook hole has a recess therein. The bridge has two nose pads disposed at two bending portions of the bridge, and two inserted bars extending upward. Each of the inserted bars has a distal end. Each of the pivot supports has a hook, a coiled ring, and a rod connecting the hook and the coiled ring. An inserted end is formed at an end of the hook. A coil is disposed at an end of each of the temples. The outer diameter of the coil is the same as the inner diameter of the coiled ring. The inserted bar is inserted in the corresponding hook hole. The distal end of the inserted bar is inserted in the corresponding recess. The hook is inserted in the corresponding hook hole also. The inserted end is inserted in the corresponding recess also. The coil is inserted in the coiled ring.

BRIEF DESCRIPTION OF THE DRAWINGS

FIG. 2A is an enlarged perspective view of a hook hole and a recess;

FIG. 3A is an enlarged, partially schematic view of an inserted bar, a hook hole and a recess;

FIG. 4A is an enlarged, partially schematic view of an inserted bar, a hook hole and a recess while they are assembled.

DETAILED DESCRIPTION OF THE INVENTION

Figure 1:
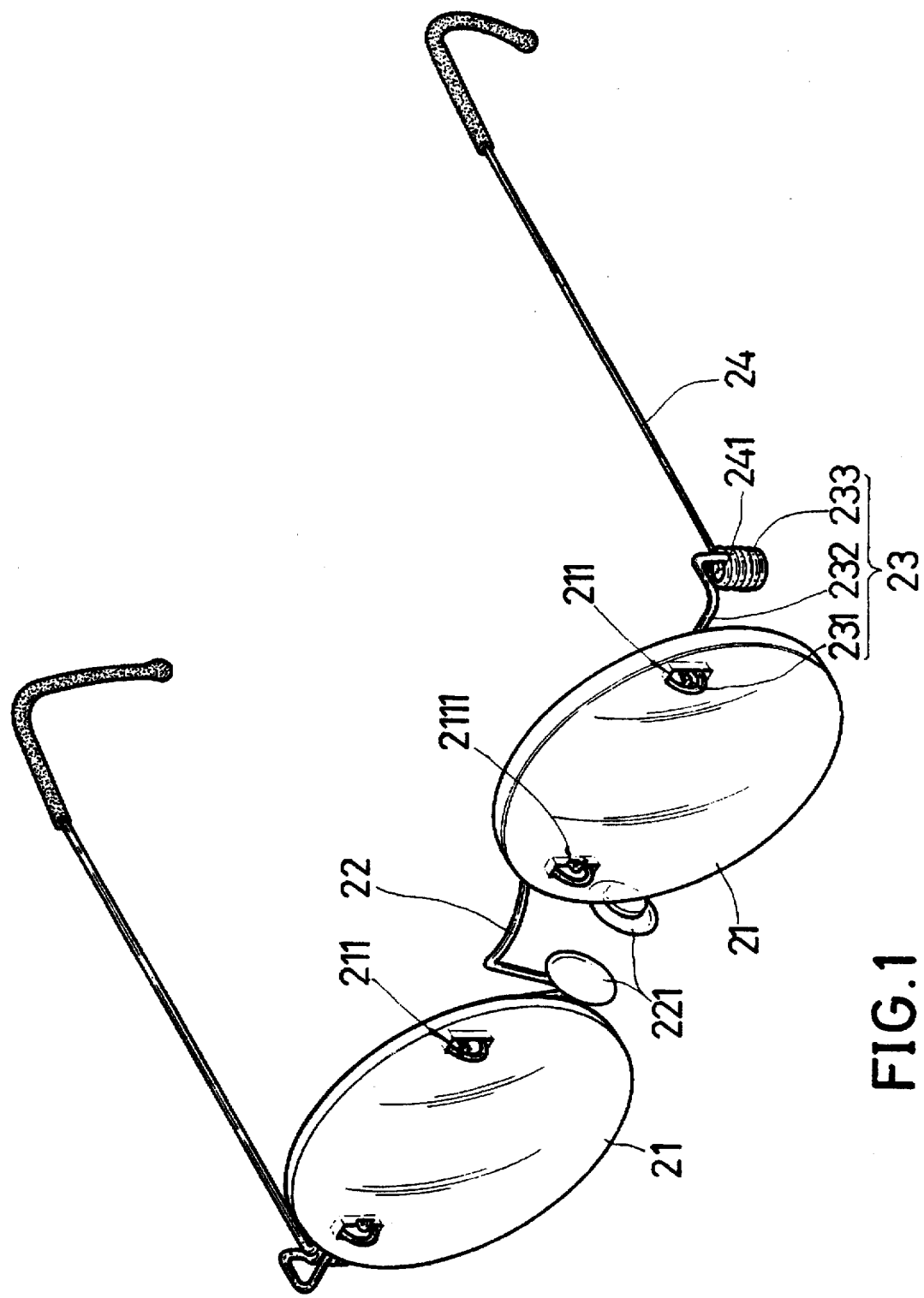
FIG. 1 is a perspective assembly view of a lens positioning device of a preferred embodiment in accordance with the invention.
Figure 2:
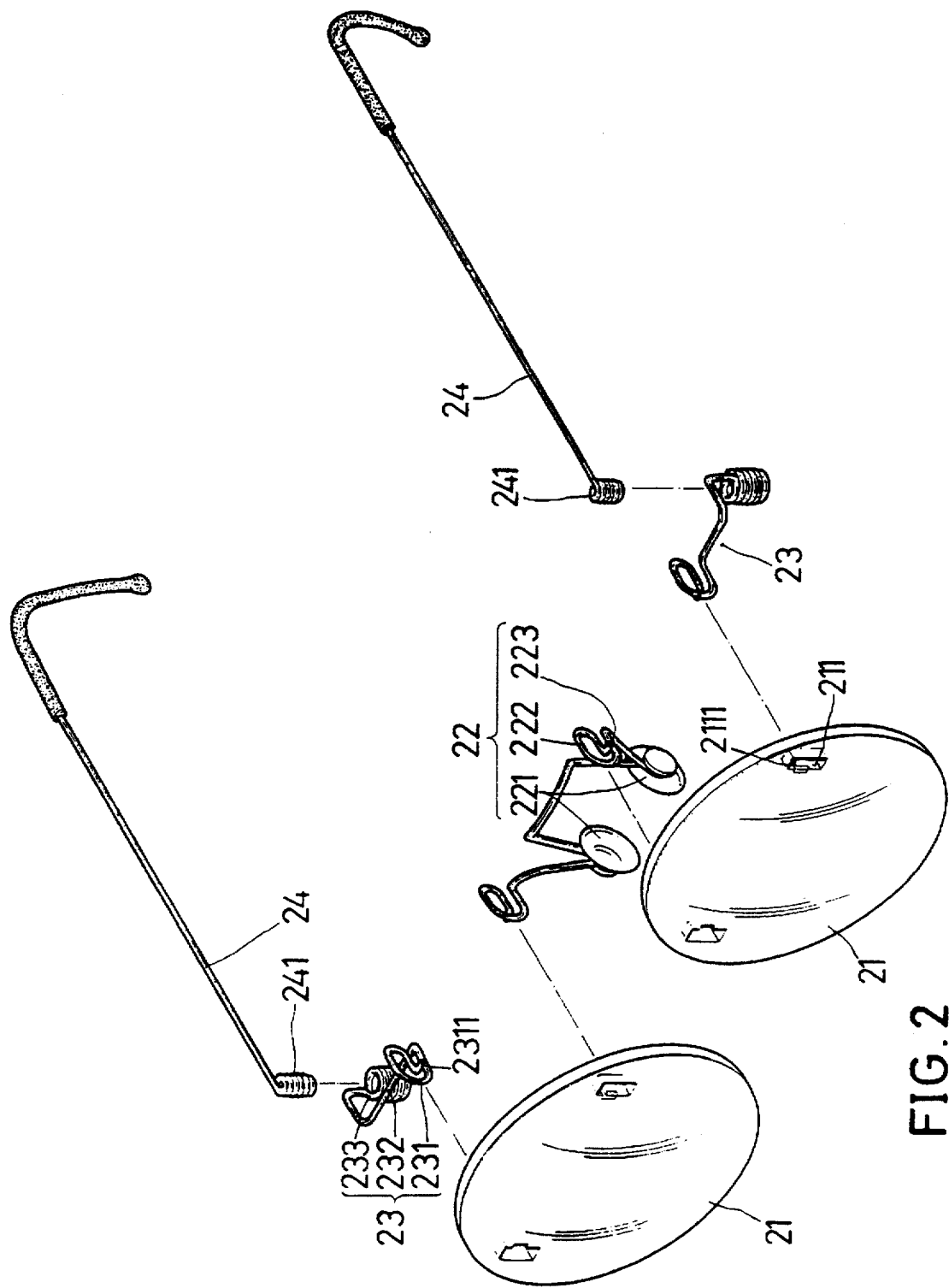
FIG. 2 is a perspective exploded view of FIG. 1.

Referring to FIGS. 1, 2 and 2A, a pair of spectacles comprises two lenses 21, two temples 24, and a lens positioning device. The lens positioning device comprises a bridge 22 disposed between two lenses 21, and two pivot supports 23. The pivot support 23 is disposed between the lens 21 and the corresponding temple 24. Each of the lenses 21 has two hook holes 211 thereon at two opposite side portions of the lens 21. Each hook hole 211 has a recess 211 therein. The bridge 22 has two nose pads 221 disposed at two bending portions of the bridge 22, and two inserted bars 222 extending upward. Each of the inserted bars 222 has a distal end 223. Each of the pivot supports 23 has a hook 231, a coiled ring 233, and a rod 232 connecting the hook 231 and the coiled ring 233. An inserted end 2311 is formed at an end of the hook 231. A coil 241 is disposed at an end of each of the temples 24. The outer diameter of the coil 241 is the same as the inner diameter of the coiled ring 233.

Figure 3:
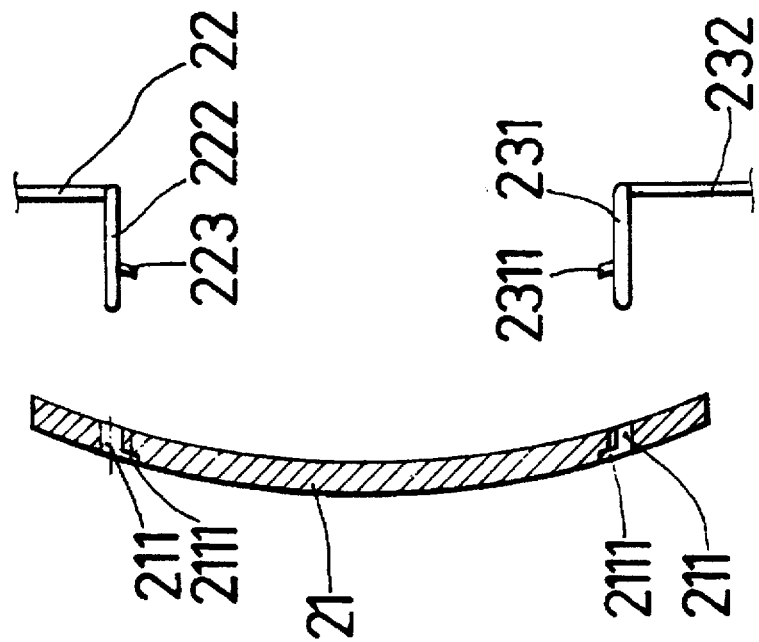
FIG. 3 is a partially schematic cross-sectional view of a bridge, a pivot support and a lens.
Figure 4:
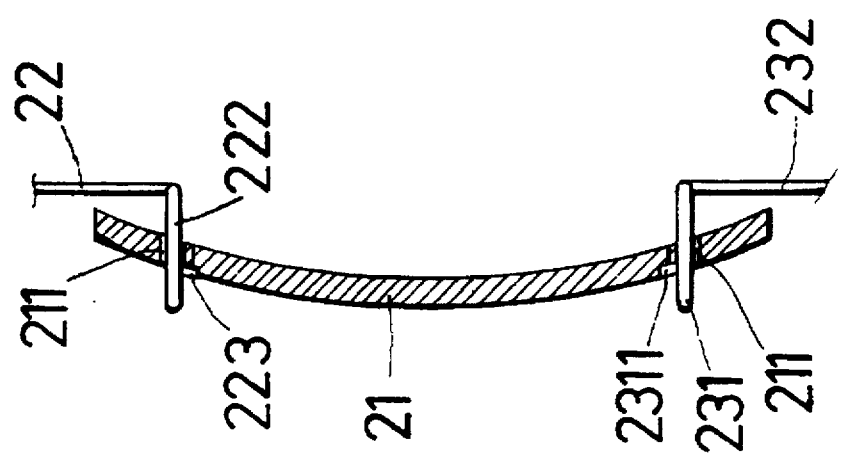
FIG. 4 is a partially schematic cross-sectional view of a bridge, a pivot support and a lens while they are assembled.

Referring to FIGS. 3 and 4, the inserted bar 222 is inserted in the corresponding hook hole 211. The distal end 223 of the inserted bar 222 is inserted in the corresponding recess 2111. The hook 231 is inserted in the corresponding hook hole 211 also. The inserted end 2311 is inserted in the corresponding recess 2111 also. The coil 241 is inserted in the coiled ring 233.

The invention has the following advantages. The hook 231 and the inserted bar 222 are flexible elements so that the lenses 21 can be positioned stably without applying screw drivers. Since the hook 231 and the inserted bar 222 are flexible, the lens positioning device has the shock-resistant function. Thus the lenses will not be detached while a pair of spectacles is bumped or fallen down. Furthermore, the lens positioning device is easily assembled without the conventional frames. The invention provides very few elements such as the bridge 22 and the pivot support 23 to contact the lens 21. Thus the elements of the spectacles can be significantly reduced. The weight of the spectacles can be reduced significantly also. Since the conventional frames of the spectacles are not used, the dust will not remain between the lenses and the frames so that the lenses can be easily cleaned.

The invention is not limited to the above embodiment but various modification thereof may be made. Further, various changes in form and detail may be made without departing from the scope of the invention.

I claim:

1. A pair of spectacles comprising:
   two lenses, two temples, and a lens positioning device;
   said lens positioning device comprisiong a bridge disposed between two lenses and two pivot supports;
   said pivot support disposed between said lens and said temple;
   each of said lenses having two hook holes thereon at two opposite side portions of said lens;
   each hook hole having a recess therein;
   said bridge having two nose pads disposed at two bending portions of said bridge, and two inserted bars extending upward;
   each of said inserted bars having a distal end;
   each of said pivot supports having a hook, a coiled ring, and a rod connecting said hook and said coiled ring;
   an inserted end formed at an end of said hook;
   a coil disposed at an end of each of said temples;
   an outer diameter of said coil the same as an inner diameter of said coiled ring;
   said inserted bar inserted in said corresponding hook hole;
   said distal end of said inserted bar inserted in said corresponding recess;

said hook inserted in said corresponding hook hole;
said inserted end inserted in said corresponding recess also; and said coil inserted in said coiled ring.

* * * * *